United States Patent [19]

Hrovat et al.

[11] Patent Number: 5,452,207
[45] Date of Patent: Sep. 19, 1995

[54] ROBUST TORQUE ESTIMATION USING MULTIPLE MODELS

[75] Inventors: Davorin D. Hrovat, Dearborn; Lee-Fei Chen, Ann Arbor, both of Mich.

[73] Assignee: Ford Motor Company, Dearborn, Mich.

[21] Appl. No.: 973,460

[22] Filed: Nov. 9, 1992

[51] Int. Cl.[6] .......................... G06F 19/00; G01L 3/00
[52] U.S. Cl. ..................... 364/424.01; 364/424.05; 364/424.1; 364/426.01; 364/431.03; 364/550; 73/862.191
[58] Field of Search ............. 364/424.01, 424.05, 364/424.1, 426.01, 426.02, 426.03, 426.04, 431.03, 431.07, 550.01, 550, 581; 477/34, 77, 78, 115, 120, 121, 131, 138, 902, 907; 180/197; 73/862.191, 862.192, 862.193, 862.194; 123/319, 349, 350, 352

[56] References Cited

U.S. PATENT DOCUMENTS

| | | | |
|---|---|---|---|
| 3,817,092 | 6/1974 | Ludloff | 73/862.192 |
| 3,921,446 | 11/1975 | Ludloff | 73/862.192 |
| 4,450,728 | 5/1984 | D'Angelo et al. | 73/862.191 X |
| 4,693,077 | 9/1987 | Skarvan et al. | 73/862.191 X |
| 4,771,848 | 9/1988 | Namba et al. | 180/197 |
| 4,985,837 | 1/1991 | Togai et al. | 364/426.02 |
| 5,010,866 | 4/1991 | Ohata | 123/436 |
| 5,046,176 | 9/1991 | Lin | 364/424.1 |
| 5,051,908 | 9/1991 | Shiraishi | 364/426.02 |
| 5,059,157 | 10/1991 | Sato | 474/18 |
| 5,069,181 | 12/1991 | Togai et al. | 123/399 |
| 5,101,786 | 4/1992 | Kamio et al. | 123/399 |
| 5,123,302 | 6/1992 | Brown et al. | 364/424.1 X |
| 5,163,530 | 11/1992 | Nakamura | 180/197 |
| 5,168,449 | 12/1992 | Benford | 364/424.1 |
| 5,184,298 | 2/1993 | Imaseki et al. | 364/424.05 |
| 5,243,526 | 9/1993 | Ito et al. | 364/426.02 |
| 5,276,624 | 1/1994 | Ito et al. | 364/424.05 |
| 5,292,288 | 3/1994 | Kashiwabara et al. | 475/63 |

*Primary Examiner*—Kevin J. Teska
*Assistant Examiner*—Collin W. Park
*Attorney, Agent, or Firm*—Roger L. May; Peter Abolins

[57] ABSTRACT

A method is provided, for use in controlling an apparatus or for use by a controller of apparatus, for estimating a single torque variable utilizing multiple models. In one embodiment, the apparatus is a vehicle. The method includes the steps of sensing operating parameters to obtain associated operating signals and obtaining estimates of the torque variable from at least two independent models. Each model generates a torque estimate signal based on the operating signals. The method also includes the steps of weighting the individual torque estimate signals according to a predefined accuracy of the associated torque model, to obtain a plurality of weighted individual torque estimate signals, and generating a final torque estimate signal based on the weighted individual torque estimate signals. Once the final torque estimate signal is obtained, the apparatus can be controlled based on the final torque estimate signal.

5 Claims, 14 Drawing Sheets

ROBUST TORQUE ESTIMATION USING MULTIPLE MODELS

TECHNICAL FIELD

The present invention relates to a method of torque estimation and, more particularly, to robust torque estimation utilizing multiple models.

BACKGROUND ART

In many automotive applications, it is highly desirable to know wheel or half-shaft torques. One such application is transmission shift control. Knowledge of wheel or axial torque is a key factor for proper synchronization. Another automotive application benefitting from knowledge of wheel torque is drive traction control.

Existing methods and systems for estimating and/or measuring torque utilize costly hardware, such as torque sensors, and provide estimates that are inaccurate. For example, U.S. Pat. No. 3,921,446, issued to Ludloff, discloses a method for individual torque determinations in systems with multiple torques acting collectively and independently, based on angular velocity and angular acceleration. Preferably, the particular relation for a subsystem torque is known in terms of both the system torque and other subsystem torques and involves a plurality of independent subsystem torques. The method includes the steps of making M independent torque determinations at a particular angular velocity, each of the torque determinations being established under operating conditions which ensure independence of the M torque determinations. The method also includes the steps of combining the torque determinations according to a known relation so as to isolate subsystem torque contributions and making the established torque available for further use.

Other United States patents involving torque estimations include U.S. Pat. Nos. 4,771,848, issued to Namba et al., 5,010,866, issued to Ohata, 5,046,176, issued to Lin and 5,101,786, issued to Kamio et al.

Due to the expense and inaccuracies associated with the existing systems and methods, it is desirable to estimate a single torque quantity, such as wheel torque, utilizing multiple models. Such a method of torque estimation would eliminate most of the inevitable inaccuracies characterizing single-model methods.

SUMMARY OF THE INVENTION

It is, therefore, an object of the present invention to provide an improved method for estimation of a single torque variable.

It is an additional object of the present invention to provide a method for robust estimation of a single torque variable utilizing multiple models.

In carrying out the above object and other objects and features of the present invention, a method is provided for estimating a single variable, for use in controlling an apparatus or for use by a controller of apparatus. The method comprises the steps of sensing at least one operating parameter and obtaining estimates of the single variable from at least two independent models, each model generating a estimate signal based on the at least one operating parameter. The method also comprises the steps of generating a final estimate signal based on the individual estimate signals and controlling apparatus operation based on the final estimate signal.

The method may also include the step of weighting the possibly filtered individual estimate signals according to a predefined accuracy of the associated model, to obtain a plurality of weighted individual estimate signals. The final estimate signal is then based on the weighted individual estimate signals.

Preferably, the apparatus is a vehicle and the single variable is torque. The step of obtaining estimates includes the steps of generating a torque estimate by modelling vehicle dynamics, generating a torque estimate by modelling the vehicle torque converter as a torque meter, and generating a torque estimate by modelling the vehicle engine and by modelling the torque converter as a torque meter. Also preferably, the step of controlling apparatus operation includes at least one of the steps of controlling engine combustion and applying braking pressure to the vehicle wheels.

The advantages accruing to the present invention are numerous. For example, a single torque variable, such as wheel torque, is accurately estimated without the need for costly torque sensors. Additionally, torque sensors can fail or suffer from degraded performance, unlike the method of the present invention. Moreover, the proposed can be combined with torque sensors in some future applications for even more reliable measurements.

BEST MODE FOR CARRYING OUT THE INVENTION

Figure 1:
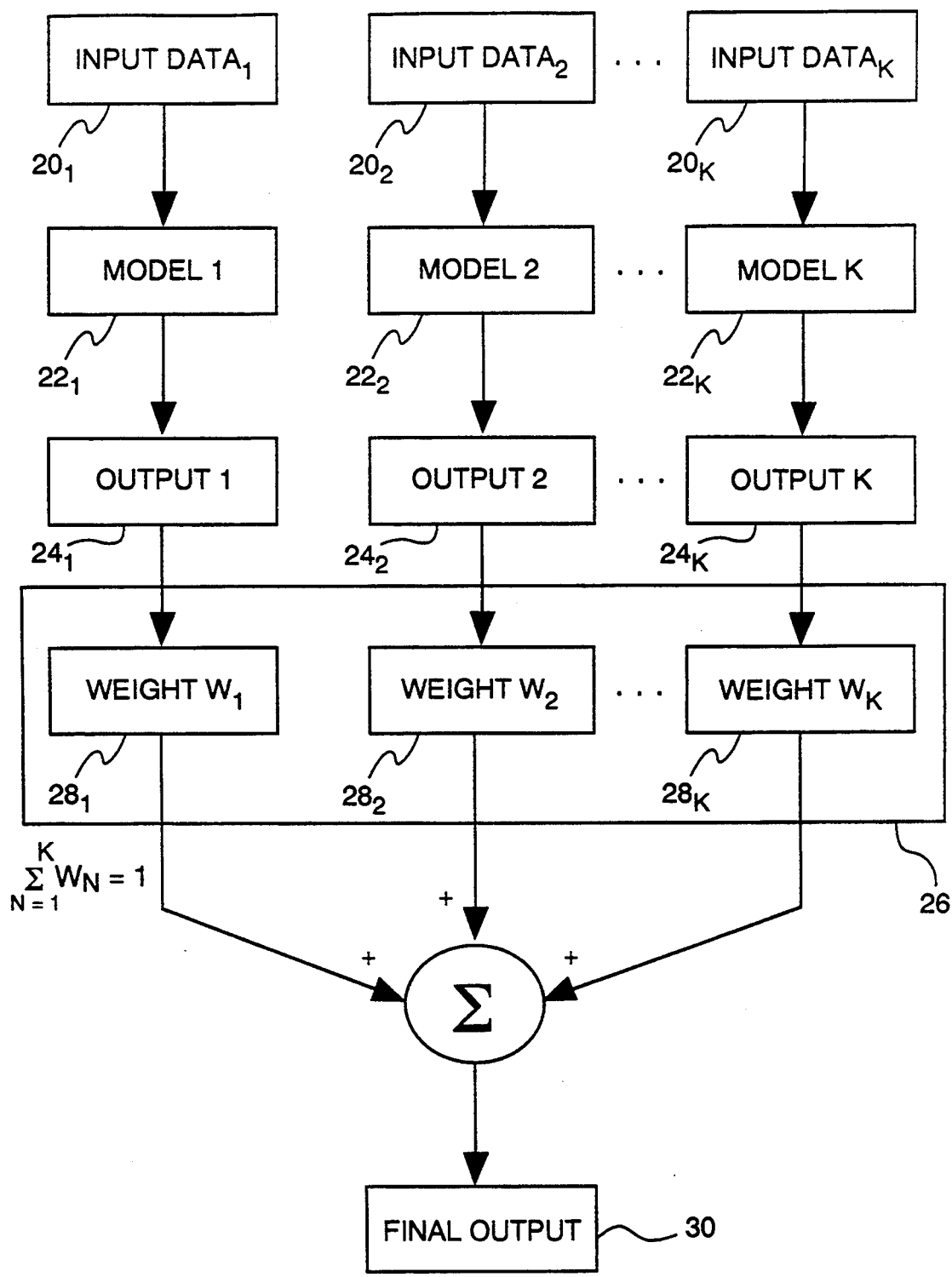
FIG. 1 is a flow chart illustrating the steps of the method of utilizing different models to predict the same physical quantity of the present invention.

Referring now to FIG. 1, there is shown a flow chart illustrating the method of utilizing different 'k' models to predict the same physical quantity of the present invention. In the preferred embodiment, the physical quantity estimated by each of the models is wheel torque. As shown in FIG. 1, input data, shown generally by reference numeral $20_{1-k}$, is provided to each of the models, shown generally by reference numeral $22_{1-k}$. Typically, the types of input data differ from model to model. The estimates (i.e. the outputs $24_1$, $24_2$ and $24_k$) computed by the models are then provided to a controller which functions as a calculating unit shown generally by reference numeral 26, such as the vehicle electronic control module. The controller 26, such as the vehicle electronic control module, applies a plurality of weighting factors $28_1$, $28_2$, and $28_k$, which preferably sum to a value of "1" to the like plurality of estimates. In the preferred embodiment, each weighting factor represents a confidence in the ability of the associated model to accurately estimate the physical quantity. For example, for a 3-model estimation, the three weighting factors could be $W_1=0.1$, $W_2=0.5$ and $W_3=0.4$. The weighted individual estimates are then summed together to obtain a final output estimate, shown generally by reference numeral 30.

Figure 2:
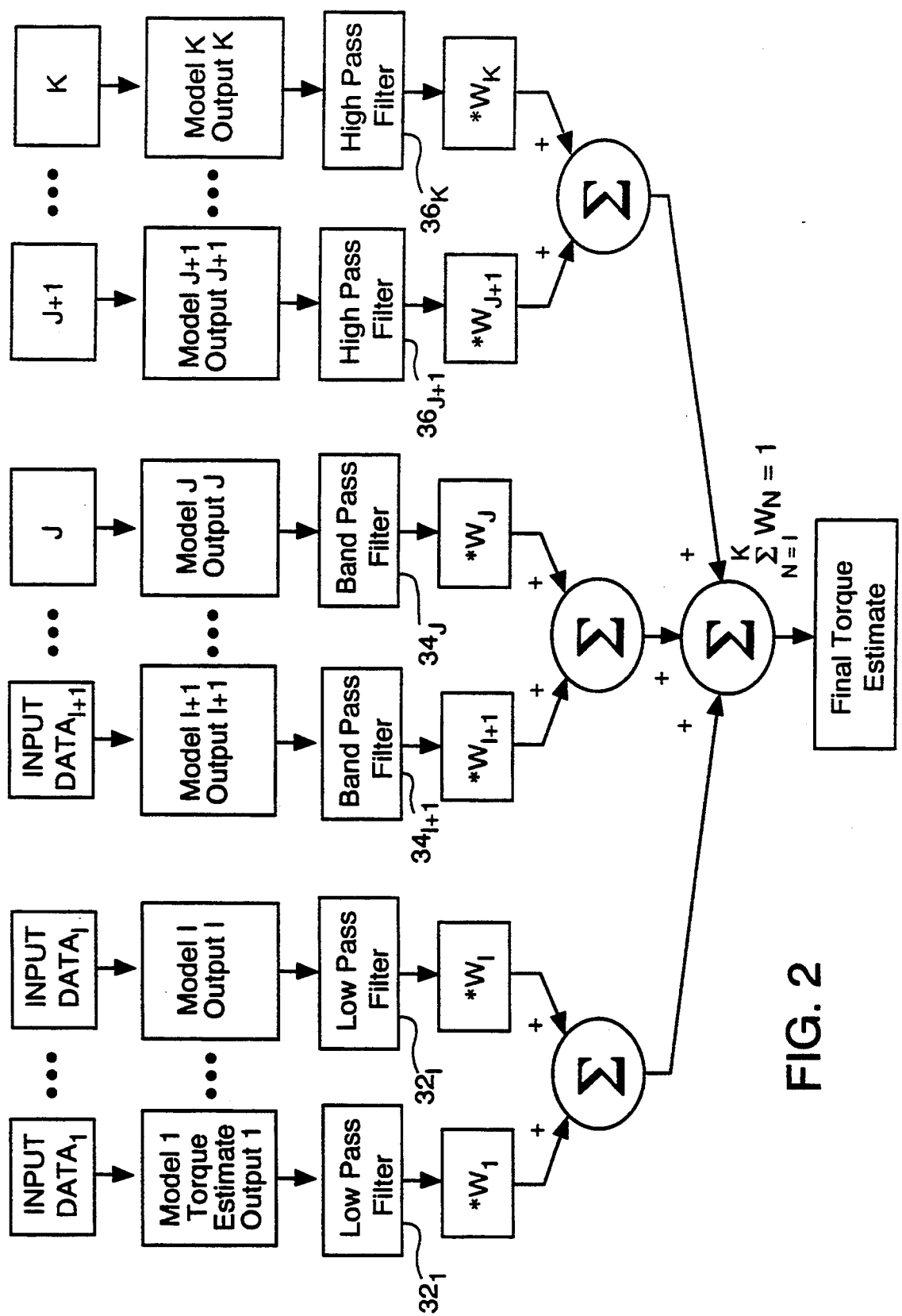
FIG. 2 is a flow chart illustrating the steps of the extended method of utilizing different filtered models to predict the same physical quantity including calibration of the present invention.

Referring now to FIG. 2, there is shown a flow chart illustrating the steps of an alternate method of the present invention for utilizing 'k' different models to estimate the same physical quantity, expanded to included a calibration aspect. As illustrated, this alternative method is substantially similar to the method shown in FIG. 1. In this embodiment, however, the individual estimates generated by the various models are communicated to low pass filters $32_1 \ldots 32_I$, band pass filters $34_{I+1} \ldots 34_j$, and high pass filters $36_{j+1} \ldots 36_k$. Weighting factors are then applied to the filtered estimates to obtain weighted estimates, which are then summed together to obtain a final estimate.

Preferably, the filters are calibrated to the models, such that the filter bandwidths correspond to the frequency range within which the models provide accurate estimates. For example, assuming model 1 . . . model I are accurate in the frequency range of 0 to A Hz, then the low pass filters $32_1 \ldots 32_I$ have bandwidths 0 to A Hz. If model I+1 . . . model J are accurate in the frequency range of A to B Hz (B>A), the band pass filters have a bandwidth of A to B Hz. Similarly, if model J+1 . . . model K are accurate for frequencies exceeding B Hz, then the high pass filters $36_{j+1} \ldots 36_k$ have bandwidths of greater than B Hz.

Figure 3A:
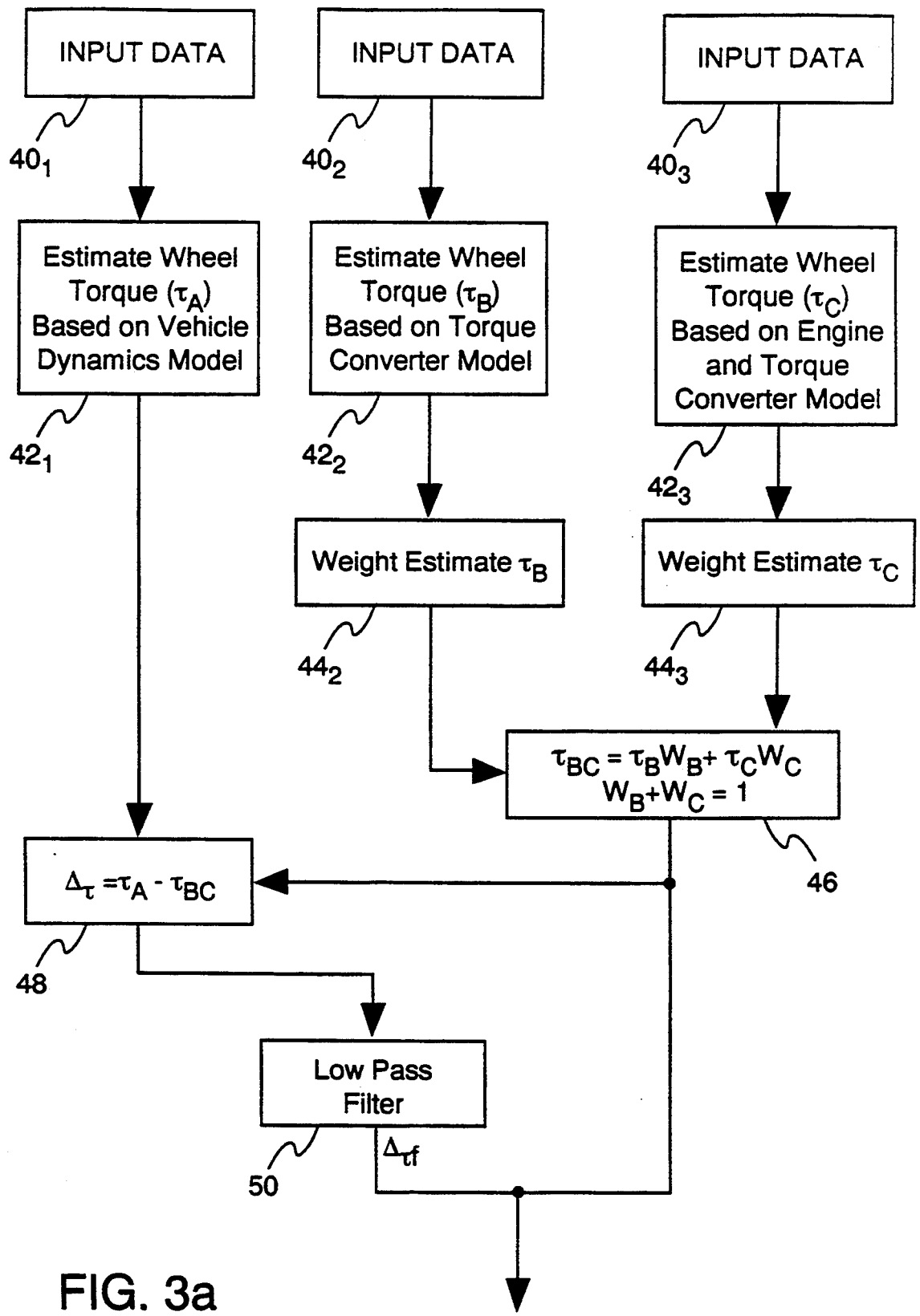
FIGS. 3a–3b are flow charts illustrating the steps of the method of utilizing multiple models to estimate wheel torque of the present invention with additive bias.

With reference now to FIG. 3a, there is shown a flow chart illustrating the method of the present invention for wheel torque estimation with additive bias. Input data for each model is first collected, at step $40_{1-3}$ by a plurality of sensors not specifically illustrated. Input data for the vehicle dynamics model preferably includes the speed of a non-driven wheel. For the torque converter model, the input data collected consists of both non-driven and driven wheel speeds, engine speed, current gear information and brake status information. The third model, which estimates wheel torque based on models of the engine and the torque converter, typically requires driven wheel speed, engine speed, throttle position, current gear and brake status information.

Figure 4:
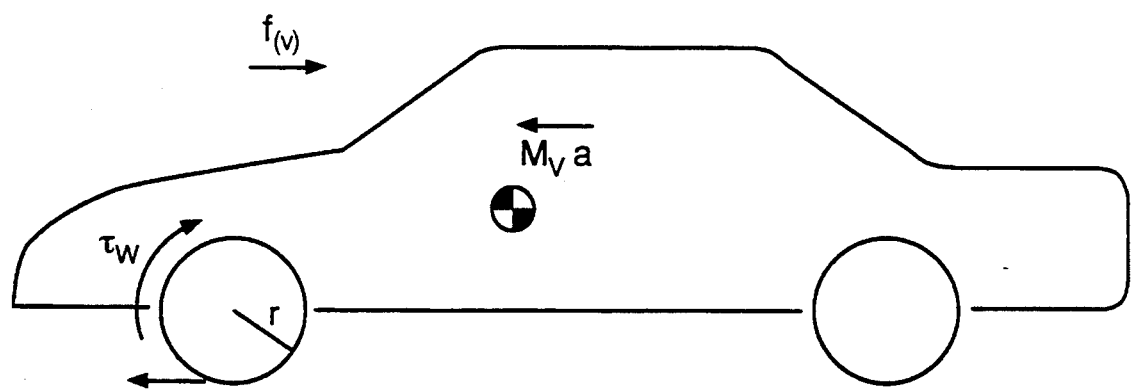
FIG. 4 is an illustration of the vehicle dynamics upon which the vehicle dynamics model for torque estimation as utilized by the present invention is based.

In the preferred embodiment, at step $42_{1-3}$, each of the models estimates the same quantity, i.e., wheel torque, based on the input data. In the preferred embodiment, the vehicle dynamics model estimates wheel torque $\tau_W$ utilizing vehicle mass ($M_v$), vehicle acceleration (a), losses due to rotational friction, wind drag, and the like (f(v)) and effective tire radius (r). These vehicle dynamics are illustrated in FIG. 4. Generally, the governing equation can be expressed as:

$$\tau_w/r - f(v) = M_v \cdot a \qquad (1)$$

By rearranging equation (1), wheel torque $\tau_w$ can be expressed as:

$$\tau_w = (M_v \cdot a + f(v)) \cdot r \qquad (2)$$

For the vehicle dynamics model, the quantities r, $M_v$, and f(v), are preferably obtained in advance. The effective tire radius, r, can be measured. Typically, $M_v$ is a known quantity, although it varies based upon the number of passengers, the weight of any on-board luggage, and the like. The losses due to friction and the like, f(v), are obtained through coast down testing and the vehicle acceleration is obtained in real time. For example, the vehicle speed, taken from a non-driven wheel can be passed through a digital differentiator, the output of which approximates vehicle acceleration.

Figure 5:
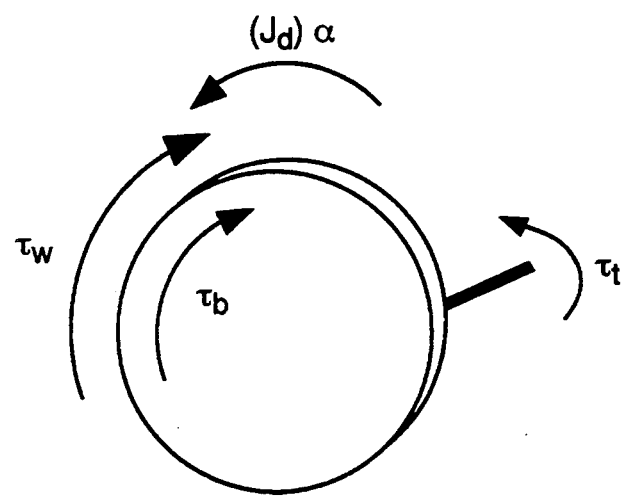
FIG. 5 is an illustration of a driven wheel for use with the torque converter, modelled as a torque meter, for use with the torque converter model for torque estimation as utilized by the present invention.

The second model utilized by the present invention for estimating wheel torque is based on a driven wheel and torque converter modelled as a torque meter, as shown in FIG. 5. Generally, for a vehicle having an automatic transmission, if the impeller and turbine speeds of the torque converter are known and the torque converter is in an open state, which is true most of the time, turbine and impeller torques can be calculated. Moving downstream from the torque converter, the torque converter torque can be multiplied by applicable gear ratios, through the differential, to obtain wheel torque.

Generally, this wheel torque estimate utilizes the following equation:

$$\tau_t - \tau_w - \tau_b = J_d \cdot a \qquad (3)$$

wherein $\tau_w$=wheel torque, $\tau_t$=turbine torque multiplied by a gear ratio, $\tau_b$=braking torque, $J_d$=downstream inertia, including turbine and wheels, and $a$=driven wheel angular acceleration. Rearranging equation (3), the wheel torque $\tau_w$ can be expressed as follows:

$$\tau_w = \tau_t - J_d \cdot a - \tau_b \qquad (4)$$

For the torque converter model, the quantity $J_d$ is preferably measured or mathematically calculated utilizing engineering drawings in advance. The quantities $\tau_t$, $\alpha$, and $\tau_b$ are preferably obtained in real time. For example, $\alpha$, the driven wheel angular acceleration, can be derived from driven wheel angular velocity $N_{wd}$ by utilizing a digital differentiator as previously described. The turbine torque can be calculated utilizing a torque converter model, the block diagram of which is shown generally by reference numeral 40 in FIG. 6.

Figure 6:
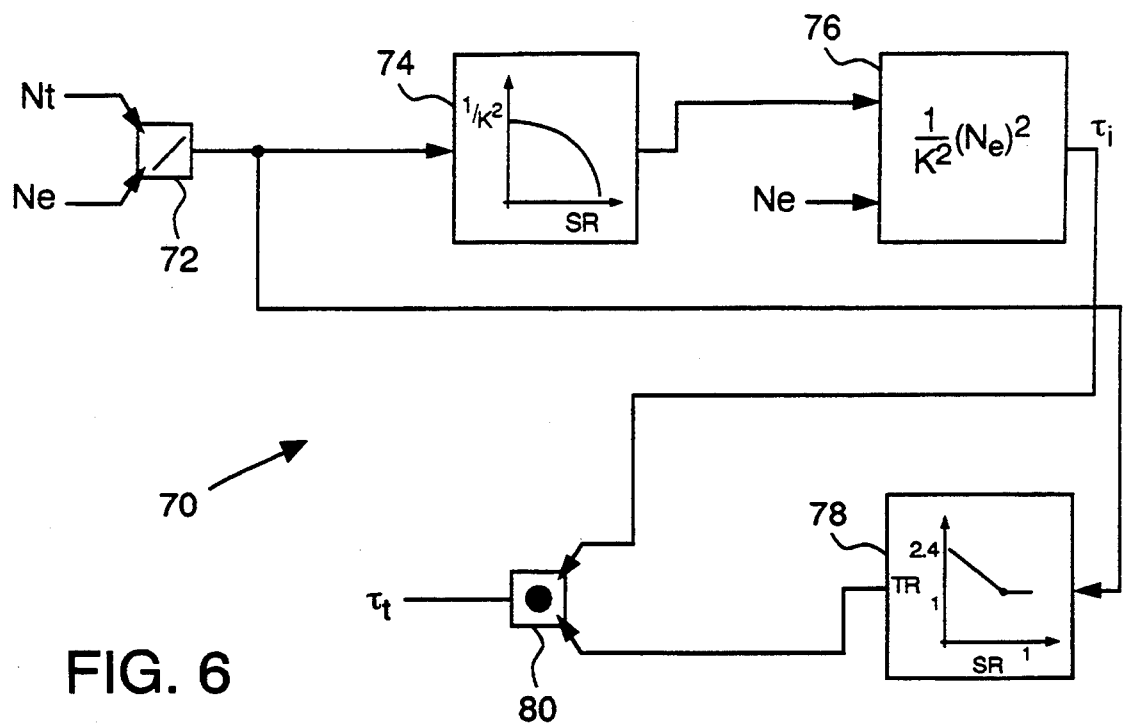
FIG. 6 is a block diagram of a model of the torque converter as implemented by the present invention.

As illustrated in FIG. 6, the inputs of the torque converter model 70 include engine speed $N_e$ (same as impeller speed) and turbine speed $N_t$. At block 72, a ratio of these speeds is obtained and provided to block 74 to determine the capacity of the torque converter to transmit torque based on stored capacity factor (k) table, which is preferably determined experimentally. For a particular speed ratio (SR) input, a corresponding torque carrying capacity ($1/k^2$) is obtained. The torque carrying capacity is then provided to block 76, which generates a value for the impeller torque, $\tau_i$ according to the following algebraic equation:

$$\tau_i = \frac{1}{k^2} * (N_e)^2 \quad (5)$$

At block 78, a torque ratio across the torque converter is obtained from the speed ratio and combined with (i.e. multiplied by) the impeller torque from block 76 at block 80, to obtain an estimate for the turbine torque, $\tau_t$. As needed, the model could be further refined by inclusion of fluid dynamic effects. Typically, $\tau_b$ is considered when the brakes are applied and is preferably calculated from brake pressure, possibly taking into account brake hydraulic dynamics.

The third model for estimating wheel torque utilized by the present invention is based on a combination of the torque converter model 70, described in greater detail above, and an engine model. Of course, a torque estimate can be obtained without an engine model. Such a torque estimate, however, includes estimation errors from torque a converter subsystem.

Figure 7:
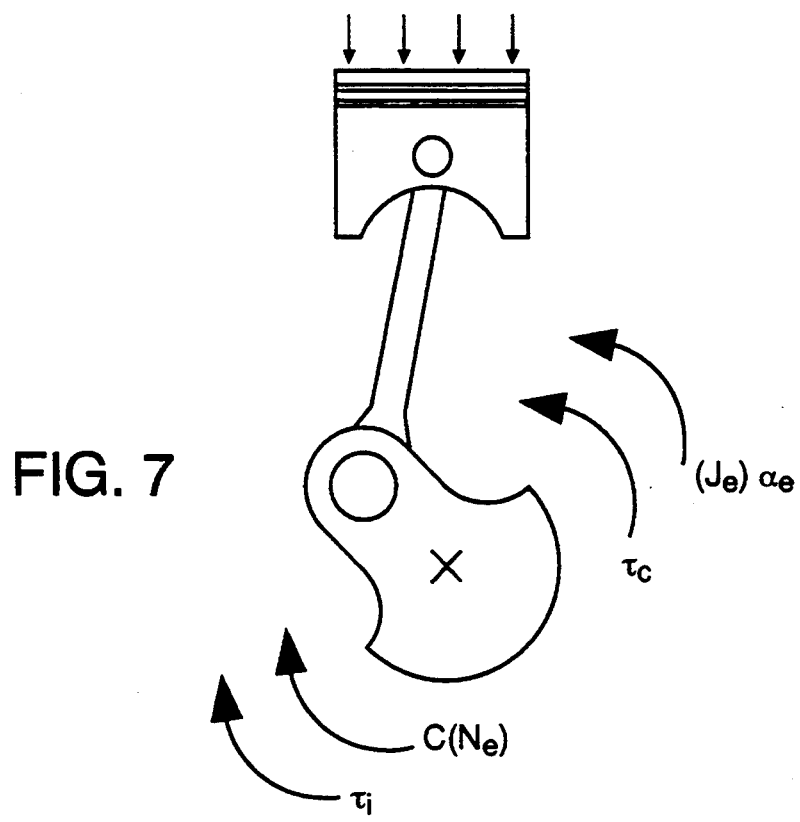
FIG. 7 is an illustration of the engine dynamics including a combustion torque ($\tau c$) upon which the engine model for torque estimation as utilized by the present invention is based.

For the engine model, the impeller torque is estimated through engine dynamics, which are illustrated in FIG. 7. As described in greater detail below, turbine torque can then be determined by multiplying the impeller torque with the torque ratio obtained utilizing the torque converter model 70. The governing equation for this third estimation is as follows:

$$\tau_c - \tau_i - C(N_\Theta) = J_\Theta \bullet \alpha_\Theta \quad (6)$$

wherein $\tau_i$=impeller torque, $\tau_c$=engine combustion torque, $C(N_e)$=engine damping torque, which is a function of engine speed $N_e$, $J_e$=engine inertia and $\alpha_e$=engine angular acceleration. Rearranging equation (5), impeller torque can be expressed as:

$$\tau_i = \tau_c - C(N_\Sigma) - J_\Sigma \bullet \alpha_\Sigma$$

In the preferred embodiment, engine inertia $J_e$ and engine damping torque $C(N_e)$ are determined in advance. Typically, engine inertia is mathematically calculated. Since engine damping torque is difficult to determine mathematically, it is usually determined experimentally. Also preferably, $\alpha_e$ is derived from $N_e$, and $\tau_c$ is obtained from a real-time engine model. After impeller torque $\tau_i$ is obtained, turbine torque $\tau_t$ can be determined utilizing the following equation:

$$\tau_t = \tau_i \bullet TR(N_t, N_\Sigma) \quad (8)$$

wherein TR=the torque ratio of $\tau_t$ and $\tau_i$, which is a function of turbine speed $N_t$ and engine speed $N_e$. Wheel torque can then be estimated utilizing equations (3) and (4) above.

Figure 8:
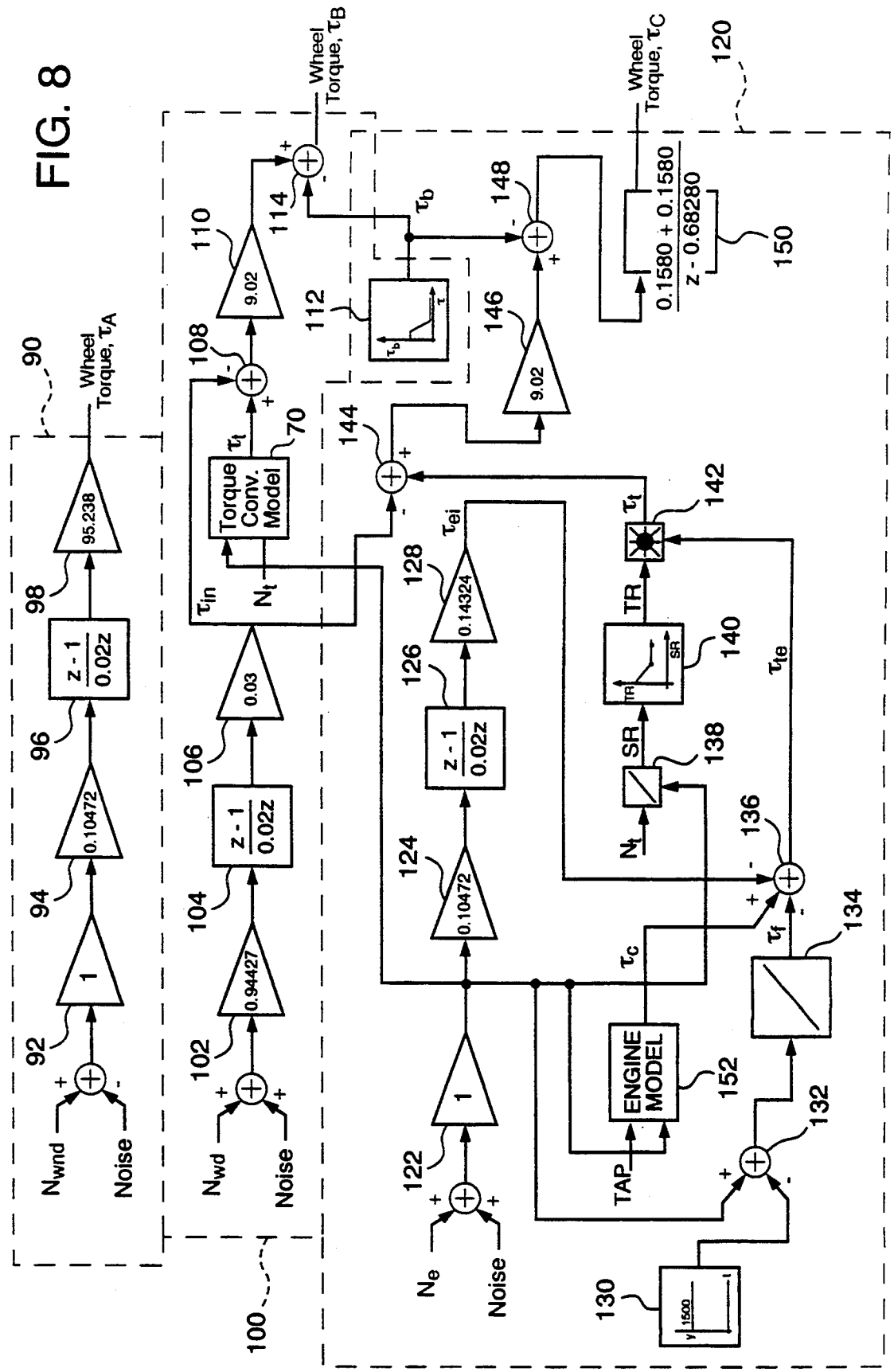
FIG. 8 is a block diagram illustrating the implementation of the method of estimating torque utilizing multiple models of the present invention.

With reference now to FIG. 8, there is illustrated a block diagram implementation of the method of the present invention. The block diagram illustrates the computation of torque utilizing the three models discussed above. The vehicle dynamics model is shown generally by reference numeral 90, the torque converter model is shown generally by reference numeral 100 and the torque converter and engine model is shown generally by reference numeral 120.

As illustrated in FIG. 8, the vehicle dynamics model 90 is based on a non-driven wheel speed $N_{wnd}$ input (RPM) and an optional input for noise for sensitivity studies. Block 92 represents an optional filter, preferably implemented to multiply the wheel speed by "1". The non-driven wheel speed is then multiplied by $2\pi r/60$ (i.e. 0.10476 for tire radius r=1 ft) at block 94, to convert RPM to radians/S, or ft/S. At block 96, the wheel velocity is passed through a differentiator to obtain vehicle acceleration. At block 98, the acceleration is multiplied by the quantity "95.238", an estimation of the total vehicle mass. The output of block 98 is the first estimate of wheel torque, $\tau_A$.

Figure 9:
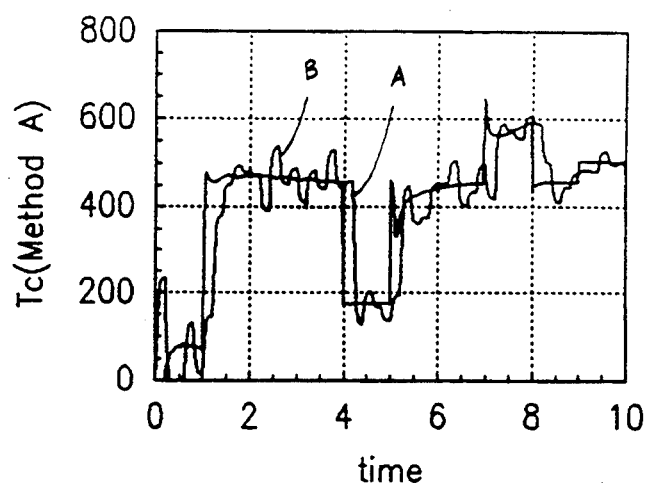
FIG. 9 is a graphical illustration of simulated wheel torque as a vehicle travels over varying road surfaces and corresponding estimated wheel torque utilizing the vehicle dynamics model.

Referring now to FIG. 9, there is shown a graph illustrating both simulated wheel torque (see trace A) for a vehicle travelling over a road surface having a varying coefficient of friction ($\mu_o$) and an associated estimated wheel torque (see trace B) utilizing the vehicle dynamics model. From about time t=1 to t=4, the road surface was packed snow ($\mu_o \approx 0.27$). From about time t=4 to t=5, the road surface was ice ($\mu_o \approx 0.1$) and from about time t=7 to t=8 the road surface was gravel ($\mu_o \approx 0.4$). It can be seen from FIG. 9 that the vehicle dynamics model is somewhat slow dynamically, but gives a good estimation for steady-state conditions. One possibility is to add an appropriate filter for steady-state or low frequency data and utilize this model in an average sense to verify the steady-state like correctness of the torque estimates provided by the torque converter model and the engine and torque converter model, both of which are discussed in greater detail below. Because the major torque estimation for this model is based on vehicle dynamics, measurement noise, such as that associated with wheel speed sensors, affects the estimation directly.

Referring once again to FIG. 8, the driven wheel speed $N_{wd}$, in RPM, and engine/impeller speed $N_e$, in RPM, are the preferred input to the torque converter model 100. Optionally, a noise signal can be added to the wheel speed signal for sensitivity studies. At block 102, the driven wheel speed is multiplied by "0.94427" (i.e. $2\pi/60$*overall gear ratio) to convert RPM to radians/S. This driven wheel velocity is then applied to block 104, a differentiator similar to block 96 of FIG. 8, which differentiates the wheel speed to obtain wheel acceleration. The acceleration is adjusted at block 106 according to downstream inertia components, such as the wheels and the turbine, to obtain an inertia torque value $\tau_{in}$. An estimate of turbine torque $\tau_t$ is obtained from the torque converter model 70 (shown in greater detail in FIG. 6), and then summed with the inertia torque at block 108. The effects of downstream gear ratios are utilized for the torque estimate at block 110. At the summer 114, the turbine torque value is summed with the brake torque from block 112, to obtain the second wheel torque estimate, $\tau_B$.

Figure 10:
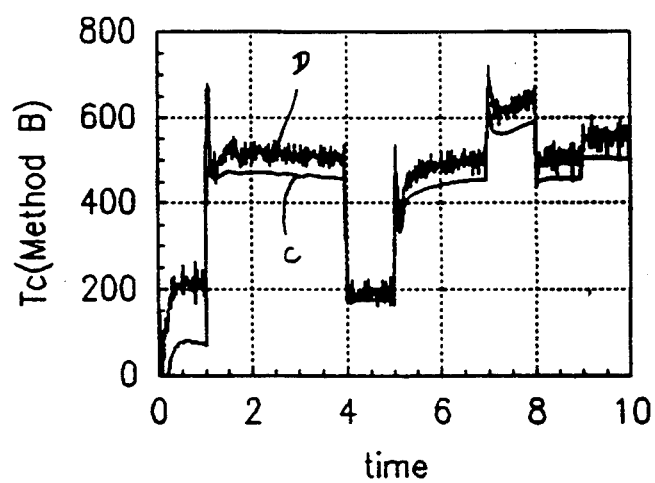
FIG. 10 is a graphical illustration of simulated wheel torque as a vehicle travels over varying road surfaces and corresponding estimated wheel torque utilizing the torque converter model.

Referring now to FIG. 10, there is shown a graph illustrating both simulated wheel torque (see trace C) for a vehicle travelling over a road surface having a varying coefficient of friction and an associated estimated wheel torque (see trace D) utilizing the torque converter model. Again, the road surface varied from packed snow, to ice to gravel. It can be seen from FIG. 10 that the torque estimation closely tracks the simulation. Thus, the torque converter model has very good dynamic response. For this reason, one of ordinary skill in the art would appreciate utilizing this model to identify wheel torque reacting to instantaneous surface changes. Since the major torque estimation for this model is based on the torque converter and wheel inertia torque acts only as a correcting factor, the torque converter model is relatively immune from wheel speed noise.

Figure 11:
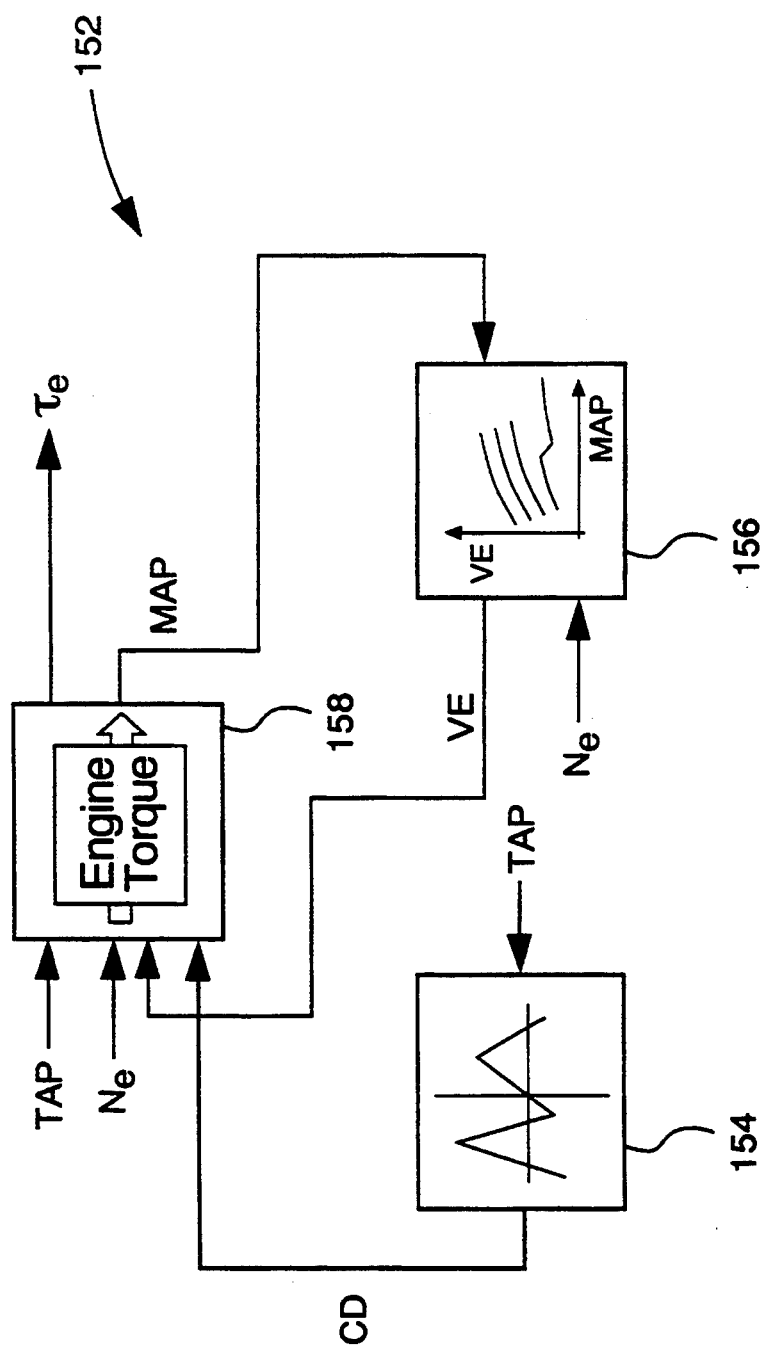
FIG. 11 is a block diagram illustrating the engine dynamics model of torque estimation as utilized by the present invention.

With combined reference to FIGS. 8 and 11, engine speed is an input to the combined torque converter and engine model, shown generally by reference numeral 120, which estimates wheel torque by modelling both the torque converter and the engine. As best shown in FIG. 11, there is illustrated a block diagram of the engine model, shown generally by reference numeral 152. Throttle position, in degrees from horizontal, is sensed and provided to block 154, to obtain the coefficient of discharge (CD) of air across the throttle plate. Volumetric efficiency (VE) is determined at block 156 based on a manifold pressure (MAP), and engine speed, $N_e$, inputs. Engine torque $\tau_e$ is determined at block 158, based on throttle position, engine speed, volumetric efficiency and the coefficient of discharge of the throttle plate.

With reference once again to FIG. 8, the combined engine and torque converter model is shown as preferably implemented by block 120. Engine speed, in RPM, is multiplied by "1" at block 122 and converted to radians/S at block 124. The engine speed is then applied to a differentiator at block 126 to obtain engine acceleration in radians/$S^2$. The acceleration is adjusted at block 128 according to engine inertia, to obtain an engine inertia torque value, $\tau_{ei}$.

Block 130 generates a constant output which represents a constant engine speed of 1500 RPM, and which is subtracted from the actual engine speed at summer 132. As is known, when engine speed increases, friction torque tends to slow the engine. Thus, the speed difference is then applied to block 134, a multiplier which represents a damping function, to obtain a friction torque value, $\tau_f$. The combustion torque $\tau_c$, the engine inertia torque $\tau_{ei}$ and the friction torque $\tau_f$ are summed together at the summer 136 to obtain a total engine torque, $\tau_{te}$.

With continued reference to FIG. 8, the engine speed from block 122 is also supplied to block 138, which combines the engine speed with turbine speed to generate a speed ratio (SR). A torque ratio (TR) is generated at block 140 based on the speed ratio. This torque ratio, as illustrated, is combined with the total engine torque $\tau_{te}$ by the multiplier 142, to obtain a turbine torque $\tau_t$.

The turbine torque from multiplier 142 is then combined with the inertia torque $\tau_{in}$ from block 106 by the summer 144. The effects of gear ratios are added by block 146 and summed with the brake torque value $\tau_b$ at summer 148. Previously unaccounted for powertrain dynamics, such as compliances and inertias of the powertrain and torque converter fluid, are added by a filter block 150 having the transfer function shown. The output of the block 150 is the third wheel torque estimate, $\tau_C$.

Figure 12:
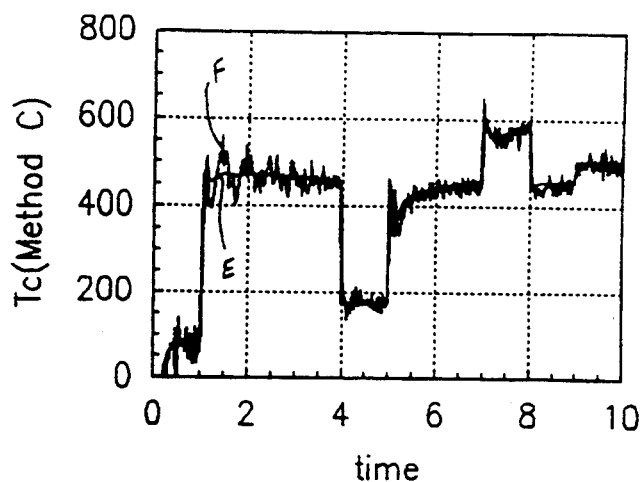
FIG. 12 is a graphical illustration of simulated wheel torque as a vehicle travels over varying road surfaces and corresponding estimated wheel torque utilizing the engine dynamics model.

Referring now to FIG. 12, there is shown a graph illustrating both simulated wheel torque (see trace E) for a vehicle travelling over a road surface having a varying coefficient of friction and estimated wheel torque (see trace F) utilizing the combination engine and torque converter model. Again, the road surface varied from packed snow, to ice to gravel. It can be seen from FIG. 12 that the torque estimation tracks the simulation relatively closely. Since much of the torque estimation for this model is based on the engine, measurement noise, such as that associated with engine speed sensors, affects the estimation directly.

With the three wheel torque estimates determined, a hybrid estimated wheel torque representing a combination of the three wheel torque estimates can be determined. In one embodiment, such as that shown in FIG. 1, the estimates are mixed, or weighted and then summed.

Figure 13:
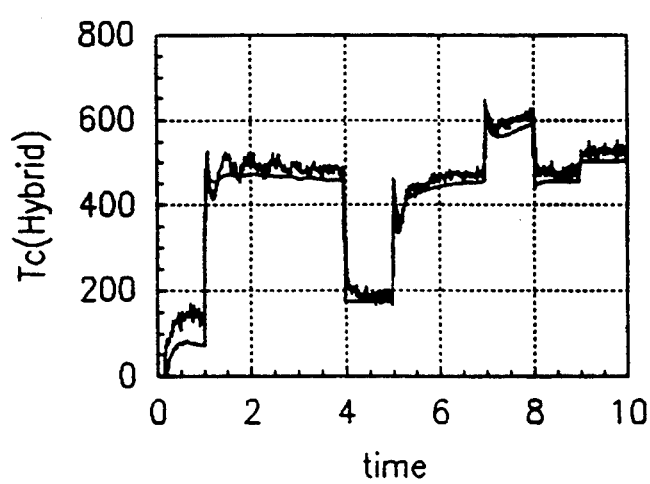
FIG. 13 is a graphical illustration of simulated wheel torque as a vehicle travels over varying road surfaces and a corresponding hybrid estimated wheel torques obtained by combining the wheel torque estimates shown in FIGS. 9, 10 and 12.

Referring now to FIG. 13, there is shown a graph illustrating both simulated wheel torque (see trace G) for a vehicle travelling over a road surface having a varying coefficient of friction and a hybrid estimated wheel torque (see trace H) representing a combination of the wheel torque estimates from the three models discussed above. The hybrid torque estimate was obtained by mixing the various estimates as previously described with reference to FIG. 1. For example, the hybrid trace represents a mix of 10% of the vehicle dynamics model estimate (see trace B, FIG. 9), 50% of the torque converter model estimate (see trace D, FIG. 10) and 40% of the engine and torque converter model estimate (see trace F, FIG. 12). As shown, the hybrid estimate has small steady-state error and noise content, demonstrating the advantages of the present invention.

Returning now to FIG. 3a, at steps $44_2$ and $44_3$ the torque estimates $\tau_B$ and $\tau_C$ are weighted utilizing weighting factors $W_B$ and $W_C$, wherein $W_B + W_C = 1$. As previously discussed, these weighting factors represent the confidence in the accuracy of the respective model. At step 46, the weighted torque estimates $\tau_B$ and $\tau_C$ are summed to obtain a torque estimate, $\tau_{BC}$. $\Delta_\tau$, obtained at step 48 by subtracting $\tau_{BC}$ from $\tau_A$, is applied to a low pass filter at step 50 to obtain $\Delta_{\tau f}$. In the preferred embodiment, the low pass filter is designed so as to let steady-state data to pass. This procedure allows the low frequency difference between $\tau_A$ and $\tau_{BC}$ to be obtained, ensuring an accurate steady-state torque estimate is available.

Figure 3B:
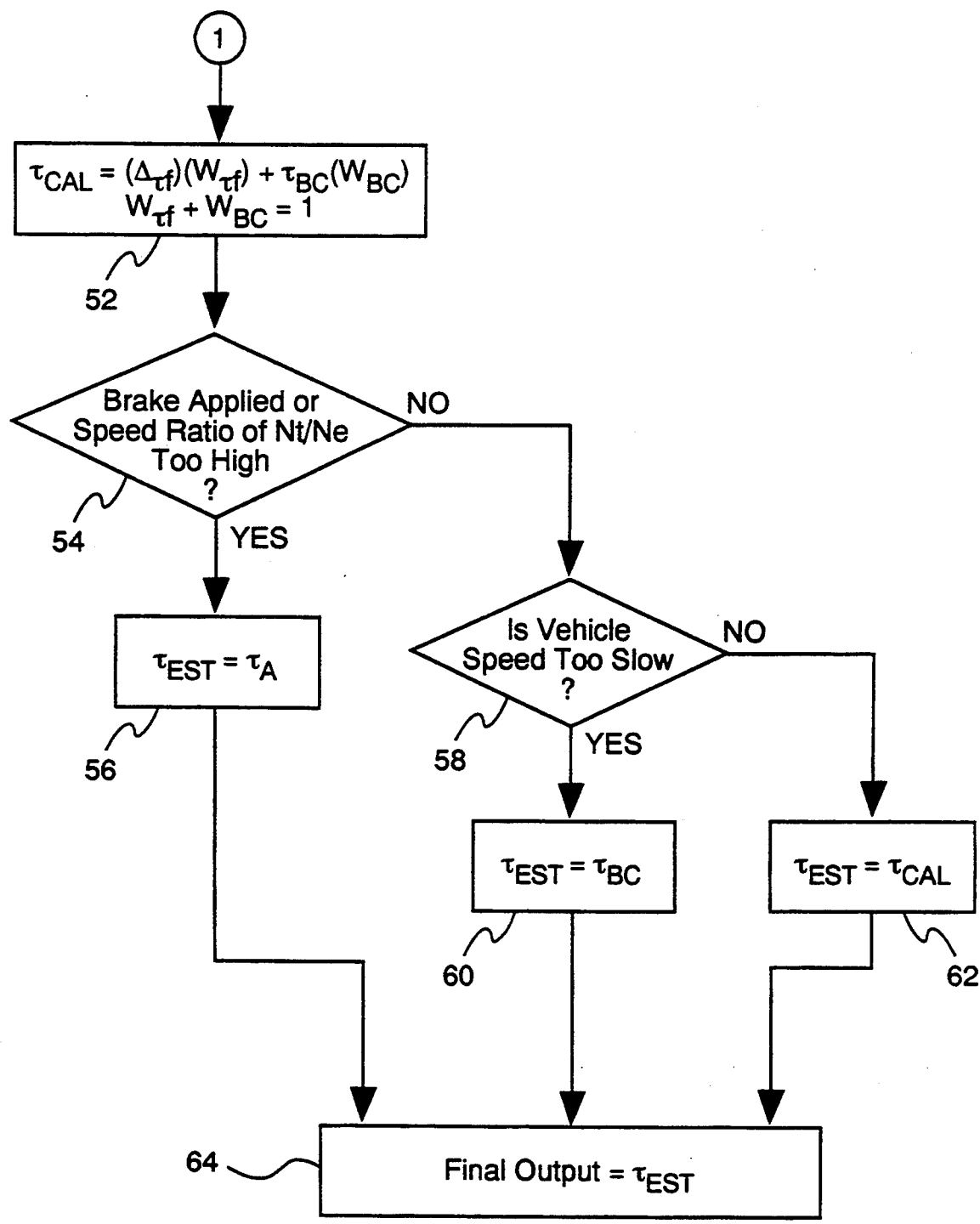

With reference now to FIG. 3b, at step 52 a calibrated torque estimate $\tau_{CAL}$ is obtained from $\Delta_{\tau f}$ and $\tau_{BC}$, which are multiplied by associated weighting factors. At step 54, the vehicle controller determines whether the brakes are being applied since brake torque is not known. Additionally, the controller determines whether the ratio of turbine speed and engine speed has exceeded a predetermined limit, since the torque converter model is not as reliable at high speed ratios. If either of these conditions is satisfied, at step 56 the variable $\tau_{EST}$ is set to the value of $\tau_A$, the torque estimate obtained from the vehicle dynamics model. If the brakes are not being applied and the speed ratio is acceptable, at step 58 the controller tests whether vehicle speed is below a predetermined limit.

With continued reference to FIG. 3b, if the vehicle speed is too slow, at step 60 the variable $\tau_{EST}$ is set to the value of $\tau_{BC}$, the weighted torque estimate previously obtained at step 46. If the vehicle speed is at an acceptable level, at step 62 the variable $\tau_{EST}$ is set to the value of $\tau_{CAL}$, the calibrated torque estimate previously obtained at step 52. At step 64, the final output is set to one of the torque estimates determined at steps 56, 60 or 62.

Once the final output is obtained, vehicle operation can be controlled so as to maintain vehicle wheel traction with the road surface. For example, engine combustion can be controlled by reducing throttle angle and/or retarding spark advance. Alternatively, brake pressure can be applied to the vehicle wheels.

One of ordinary skill in the art will readily appreciate that the methods of the present invention have many potential uses, aside from the use with a vehicle as described herein. For example, the methods of the present invention could be utilized to solve any estimation problem, especially where one needs to estimate a physical quantity capable of being expressed by dynamic models.

Figure 14A:
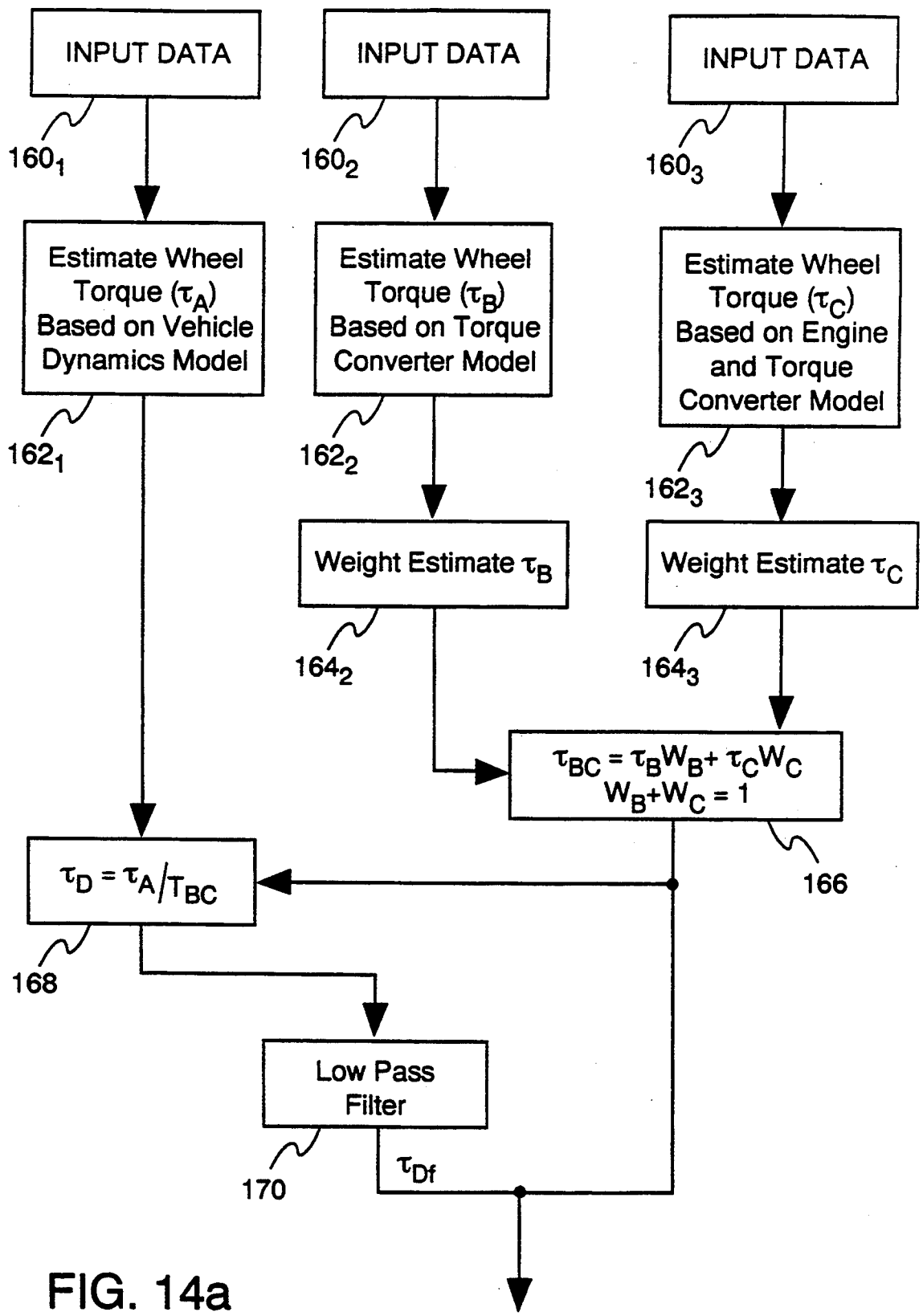
FIGS. 14a–14b are a flow chart illustrating the steps of an alternate method for wheel torque estimation of the present invention, utilizing multiplier bias.
Figure 14B:
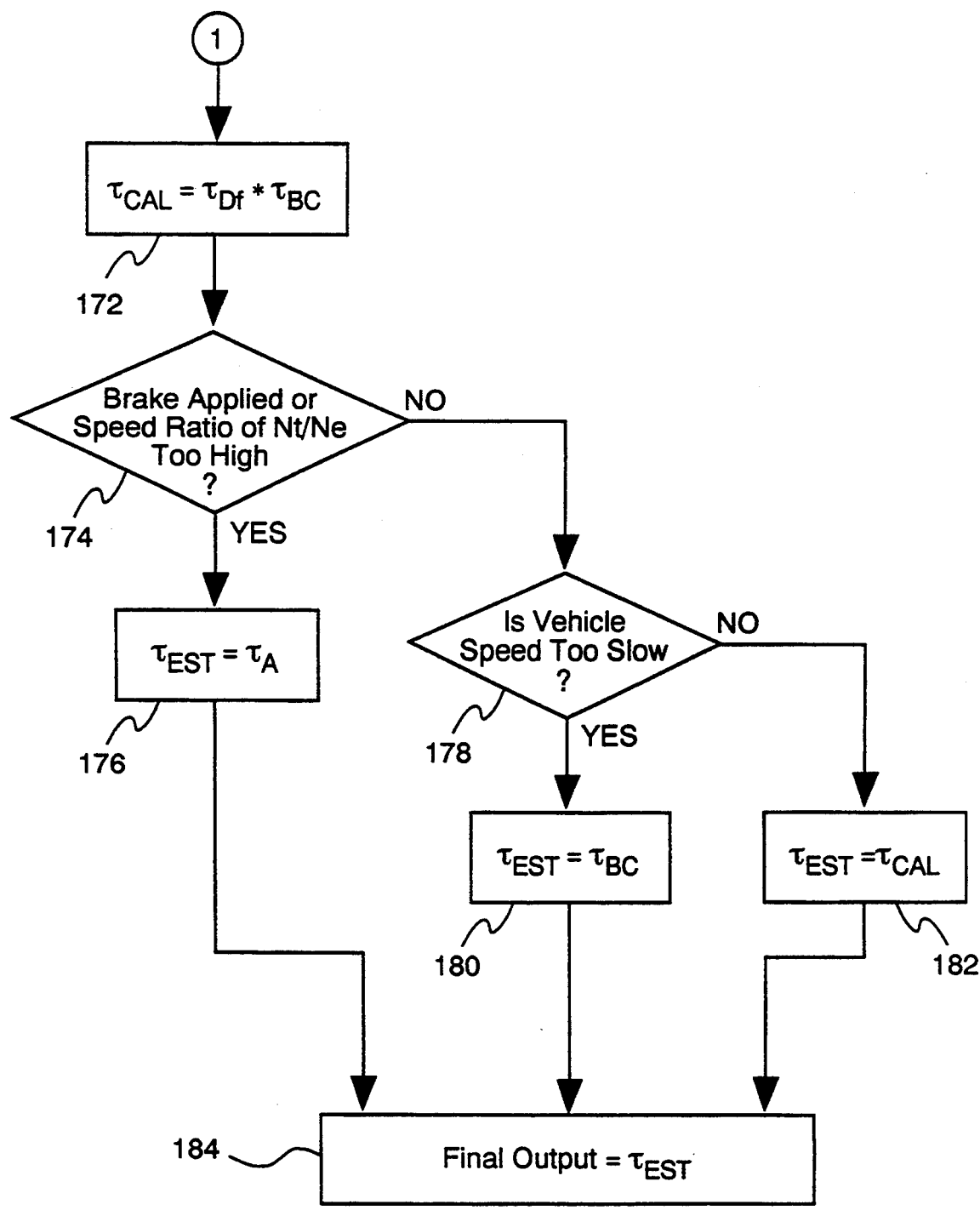

Referring now to FIGS. 14a and 14b, there is shown a flow chart illustrating an alternate method of the present invention for wheel torque estimation with multiplier bias. Torque estimation utilizing multiplier bias should provide a better estimate of wheel torque when large torque values are expected. As shown in FIG. 14a, input data for each model is first collected, at steps $160_{1-3}$, by a plurality of sensors not specifically illustrated. Preferably, input data for the vehicle dynamics model consists of the speed of a non-driven wheel. For the torque converter model, the input data collected consists of both non-driven and driven wheel speeds, engine speed, current gear information and brake status information. The engine and torque converter model preferably utilizes driven wheel speed, engine speed, throttle position, current gear and brake status information.

In the preferred embodiment, at steps $162_{1-3}$, each of the models estimates wheel torque based on the input data, as described in greater detail above with reference to FIGS. 4 through 13. At steps $164_2$ and $164_3$ the torque estimates $\tau_B$ and $\tau_C$ are weighted utilizing weighting factors $W_B$ and $W_C$, wherein $W_B + W_C = 1$. As previously discussed, these weighting factors represent the confidence in the accuracy of the respective model. At step 166, the weighted torque estimates $\tau_B$ and $\tau_C$ are summed to obtain a torque estimate, $\tau_{BC}$. $\tau_D$, obtained at step 168 by dividing $\tau_A$ by $\tau_{BC}$, is applied to a low pass filter at step 170 to obtain $\tau_{Df}$. As previously mentioned, this low pass filter allows steady-state data to pass.

With reference now to FIG. 14b, at step 172 a calibrated torque estimate $\tau_{CAL}$ is obtained from $\tau_{Df}$ and $\tau_{BC}$. At step 174, the vehicle controller determines whether the brakes are being applied since brake torque is not known. Additionally, the controller determines whether the ratio of turbine speed and engine speed has exceeded a predetermined limit, since the torque converter model is not as reliable at high engine speed ratios. If either of these conditions is satisfied, at step 176 the variable $\tau_{EST}$ is set to the value of $\tau_A$, the torque estimate obtained from the vehicle dynamics model. If the brakes are not being applied and the speed ratio is acceptable, at step 178 the controller tests whether vehicle speed is below a predetermined limit.

With continued reference to FIG. 14b, if the vehicle speed is too slow, at step 180 the variable $\tau_{EST}$ is set to the value of $\tau_{BC}$, the weighted torque estimate previously obtained at step 166. If the vehicle speed is at an acceptable level, at step 182 the variable $\tau_{EST}$ is set to the value of $\tau_{CAL}$, the calibrated torque estimate previously obtained at step 172. At step 184, the final output is set to one of the torque estimates determined at steps 176, 180 or 182. Once the final output is obtained, vehicle operation (e.g. engine combustion, brake pressure or the like) can be controlled so as to maintain vehicle wheel traction with the road surface.

Figure 15A:
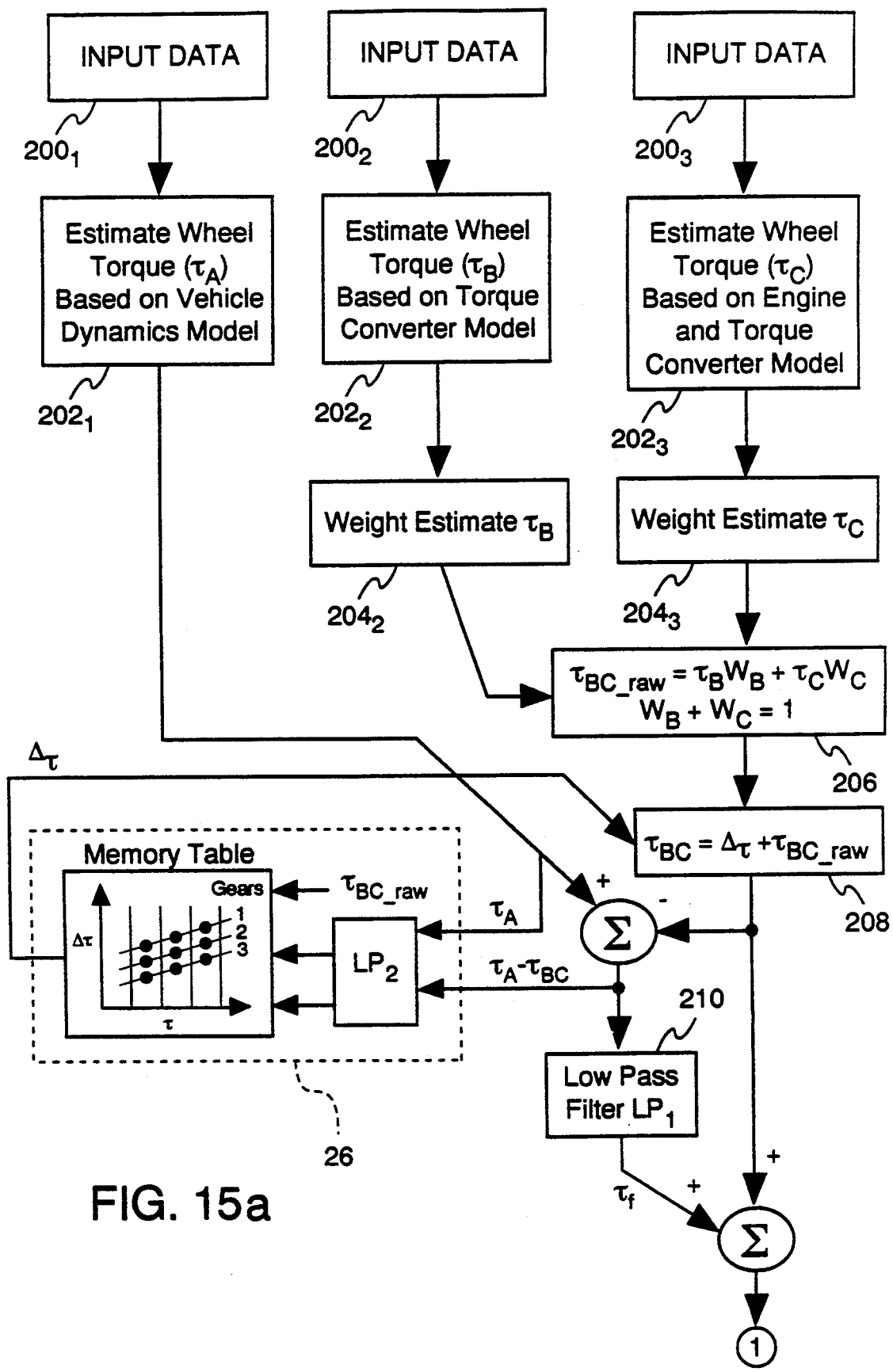
FIGS. 15a–15b are a flow chart illustrating the steps of an alternate method for wheel torque estimation of the present invention, utilizing learning and correcting of additive bias.
Figure 15B:
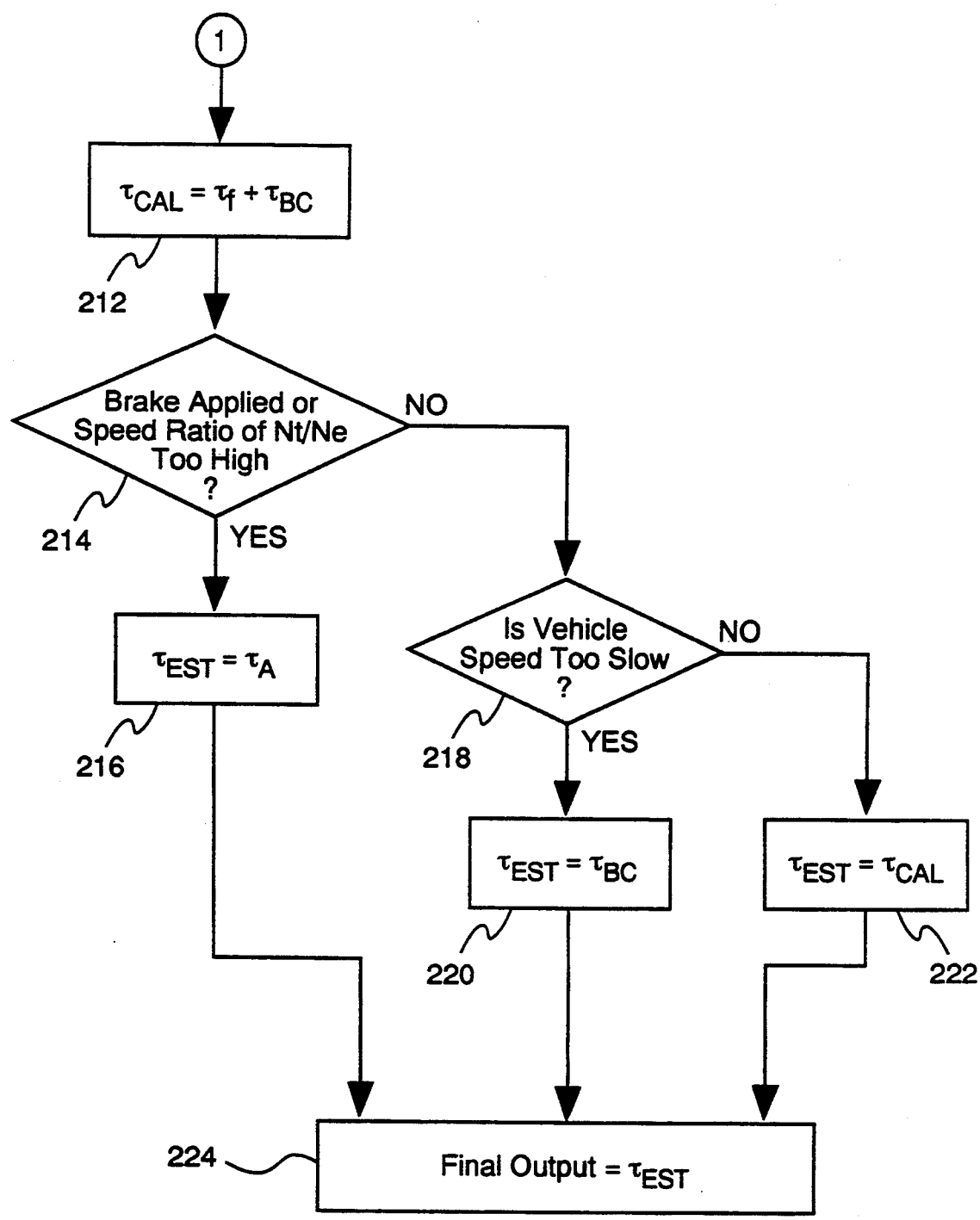

Referring now to FIGS. 15a and 15b, there is shown a flow chart illustrating yet another method of the present invention for wheel torque estimation, utilizing learning and correcting of additive bias. As shown in FIG. 15a, input data for each model is first collected at steps $200_{1-3}$. At step $200_1$, input data, preferably consisting non-driven wheel speed, for the vehicle dynamics model is collected. For the torque converter model, the input data preferably consists of both non-driven and driven wheel speeds, engine speed, current gear information and brake status information. The engine and torque converter model utilizes driven wheel speed, engine speed, throttle angle position, current gear and brake status information.

With continuing reference to FIG. 15a, at steps $202_{1-3}$, each of the models estimates wheel torque based on the input data, as described in greater detail above with reference to FIGS. 4 through 13. At steps $204_2$ and $204_3$ the torque estimates $\tau_B$ and $\tau_C$ are weighted utilizing weighting factors $W_B$ and $W_C$, wherein $W_B + W_C = 1$. At step 206, the weighted torque estimates are summed together to obtain a "raw" torque estimate, $\tau_{BC\_raw}$.

At step 208, a corrected torque estimate $\tau_{BC}$ is obtained from $\Delta_\tau$ and $\tau_{BC\_raw}$. $\Delta_\tau$ represents a correction factor and is obtained from a memory table in the controller 26, based on the quantities $\tau_A$, $\tau_A - \tau_{BC}$ and $\tau_{BC\_raw}$. The quantities $\tau_A$, $\tau_A - \tau_{BC}$ and $\tau_{BC\_raw}$ are summed to obtain a total torque $\tau_{tot}$. The memory table is preferably stored in a non-volatile memory and contains a plurality of adaptive, or learned, torque values for each transmission gear. The table values are updated intermittently during vehicle operation. The table value is compared to the total torque value $\tau_{tot}$ and, if an adjustment is required, a corresponding correction value $\Delta_\tau$ is generated and added to $\tau_{BC\_raw}$ at step 208. As shown in FIG. 15a, $\tau_A$ and $\tau_A - \tau_{BC}$ are first applied to a low pass filter LP2, which allows steady-state data to pass. One of ordinary skill in the art should appreciate that this process helps to prevent an unacceptable biasing of the final torque estimate due to a failure in the vehicle dynamics model.

At step 210, the quantity $\tau_A - \tau_{BC}$ is applied to a low pass filter, which allows the low frequency difference between $\tau_A$ and $\tau_{BC}$ to be obtained, ensuring an accurate steady-state torque estimate. At step 212 a calibrated torque estimate $\tau_{CAL}$ is obtained from $\tau_f$ and $\tau_{BC}$. At step 214, the vehicle controller determines whether the brakes are being applied or whether the ratio of turbine speed and engine speed has exceeded a predetermined limit. If either of these conditions is satisfied, at step 216 the variable $\tau_{EST}$ is set to the value of $\tau_A$, the torque estimate obtained from the vehicle dynamics model. If the brakes are not being applied and the speed ratio is acceptable, at step 218 the controller tests whether vehicle speed is below a predetermined limit.

With continued reference to FIG. 15b, if the vehicle speed is too slow, at step 220 the variable $\tau_{EST}$ is set to the value of $\tau_{BC}$, the weighted torque estimate previously obtained at step 208. If the vehicle speed is at an acceptable level, at step 222 the variable $\tau_{EST}$ is set to the value of $\tau_{CAL}$, the calibrated torque estimate previously obtained at step 212. At step 224, the final output is set to one of the torque estimates determined at steps 216, 220 or 222. As previously described, the final output can be utilized to control vehicle operation.

It is to be understood, of course, that while the forms of the invention described above constitute the preferred embodiments of the invention, the preceding description is not intended to illustrate all possible forms thereof. It is also to be understood that the words used are words of description, rather than limitation, and that various changes may be made without departing from the spirit and scope of the invention, which should be construed according to the following claims.

We claim:

1. A method of estimating wheel torque in a vehicle having a plurality of wheels, the vehicle being controlled by an electronic control unit having a memory, the method comprising the steps of:

sensing at least one vehicle operating parameter to obtain an operating signal;

modelling wheel torque utilizing at least two independent models to obtain a like plurality of individual torque estimate signals, each model generating an individual torque estimate signal based on the operating signal;

weighting the individual torque estimate signals according to a predefined accuracy of the associated torque model to obtain a plurality of weighted individual torque estimate signals;

generating a final torque estimate signal based on the weighted individual torque estimate signals;

controlling vehicle operation based on the final torque estimate signal;

said step of modelling including the step of generating a torque estimate by modelling vehicle dynamics;

said step of generating including estimating wheel torque according to:

$$\tau_w = (M_v \cdot a + f(v)) \cdot r$$

wherein $\tau_w$=wheel torque, $M_v$ represents vehicle mass, a=vehicle acceleration, f(v)=losses due to rotational friction and wind drag, and r=the effective radius of the tire on the vehicle wheel.

2. The method of estimating wheel torque as set forth in claim 1 wherein said vehicle includes a torque converter and wherein said step of modelling includes also the step of generating a torque estimate by modelling said torque converter as a torque meter.

3. The method of estimating wheel torque as set forth in claim 1 wherein said vehicle includes an engine and a torque converter and wherein said step of modelling includes also the steps of generating a torque estimate by modelling said engine and by modelling said torque converter as a torque meter.

4. The method of estimating wheel torque as set forth in claim 1 wherein the final torque estimate is adaptively corrected using a plurality of torque correction values stored in memory.

5. A method of estimating wheel torque in a vehicle having a plurality of wheels, the vehicle being controlled by an electronic control unit having memory, the method comprising the steps of:

sensing at least one vehicle operating parameter to obtain an operating signal;

modelling wheel torque utilizing at least two independent models to obtain a like plurality of individual torque estimate signals, each model generating an individual torque estimate signal based on the operating signal;

weighting the individual torque estimate signals according to a predefined accuracy of the associated torque model to obtain a plurality of weighted individual torque estimate signals:

generating a final torque estimate signal based on the weighted individual torque estimate signals;

controlling vehicle operation based on the final torque estimate signal;

said vehicle including a torque converter, the step of modelling including the step of generating a torque estimate by modelling the torque converter as a torque meter;

said step of generating including estimating wheel torque according to:

$$\tau_w = \tau_t - J_d \cdot \alpha - \tau_b$$

wherein $\tau_w$=wheel torque, $\tau_t$=turbine torque of the torque converter reelected at the wheel, $\tau_b$=braking torque, $J_d$=inertia of vehicle drivetrain components downstream from the torque converter, and $\alpha$=angular acceleration of a driven vehicle wheel.

* * * * *